(12) United States Patent
Kemisetti et al.

(10) Patent No.: US 12,393,525 B2
(45) Date of Patent: Aug. 19, 2025

(54) RESERVING A SECURE ADDRESS RANGE (71) Applicant: QUALCOMM Incorporated, San Diego, CA (US)

(72) Inventors: Rajesh Kemisetti, Hyderabad (IN); Deepak Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 18/557,239

(22) PCT Filed: Jun. 2, 2022

(86) PCT No.: PCT/US2022/072706
§ 371 (c)(1),
(2) Date: Oct. 25, 2023

(87) PCT Pub. No.: WO2023/278925
PCT Pub. Date: Jan. 5, 2023

(65) Prior Publication Data
US 2024/0220425 A1 Jul. 4, 2024

(30) Foreign Application Priority Data
Jun. 29, 2021 (IN) .............................. 202141029184

(51) Int. Cl.
*G06F 12/14* (2006.01)
*G06F 12/1036* (2016.01)
*G06F 21/79* (2013.01)

(52) U.S. Cl.
CPC ...... *G06F 12/1458* (2013.01); *G06F 12/1036* (2013.01); *G06F 21/79* (2013.01)

(58) Field of Classification Search
None
See application file for complete search history.

(56) References Cited

U.S. PATENT DOCUMENTS 5,873,120 A * 2/1999 Harvey ................ G06F 9/5016
711/212
2002/0052727 A1 5/2002 Bond et al.
(Continued)

FOREIGN PATENT DOCUMENTS

EP 3385850 A1 10/2018

OTHER PUBLICATIONS

International Search Report and Written Opinion—PCT/US2022/072706—ISA/EPO—Sep. 28, 2022.

*Primary Examiner* — Kaushikkumar M Patel
(74) *Attorney, Agent, or Firm* — Patterson + Sheridan LLP (57) ABSTRACT

The present disclosure relates to methods and apparatus for graphics processing. Aspects of the disclosure are directed to a method for accessing secure memory ranges. In some examples, the method includes reserving a first memory address range within a 32-bit address range for non-secure memory. In some examples, the method includes reserving a second memory address range within a 64-bit address range and outside the 32-bit address range for secure memory. In some examples, the method includes receiving, by a 64-bit kernel, a first command from a 32-bit application for accessing the secure memory. In some examples, the method includes preparing, by the 64-bit kernel, a 64-bit memory access command based on the first command. In some examples, the method includes transmitting, by the 64-bit kernel, the 64-bit memory access command to a graphics processing unit (GPU).

30 Claims, 4 Drawing Sheets (56) References Cited

U.S. PATENT DOCUMENTS

| | | | |
|---|---|---|---|
| 2005/0114639 A1 | 5/2005 | Zimmer | |
| 2011/0029820 A1* | 2/2011 | Sehr | G06F 21/53 |
| | | | 714/E11.217 |
| 2011/0153953 A1 | 6/2011 | Khemani et al. | |
| 2014/0359248 A1* | 12/2014 | Peters | G06F 12/0223 |
| | | | 711/171 |
| 2014/0365742 A1* | 12/2014 | Patel | G06F 21/52 |
| | | | 711/163 |
| 2016/0350161 A1* | 12/2016 | Jin | G06F 9/54 |
| 2018/0129620 A1* | 5/2018 | Gittins | G06F 12/1027 |
| 2019/0294537 A1* | 9/2019 | Bond | G06F 11/3688 |

\* cited by examiner

RESERVING A SECURE ADDRESS RANGE

CROSS-REFERENCE TO RELATED APPLICATION

This Application is a national stage application under 35 U.S.C. 371 of PCT/US2022/072706, filed Jun. 2, 2022, which claims benefit of and priority to India patent application No. 202141029184, filed Jun. 29, 2021, which are assigned to the assignee hereof and hereby expressly incorporated by reference herein in their entireties as if fully set forth below and for all applicable purposes.

BACKGROUND

Field of the Disclosure

The present disclosure relates generally to processing systems and, more particularly, to one or more techniques for graphics processing.

Description of Related Art

Graphics processing units (GPUs) may support processing of secure (e.g., digital rights management (DRM) protected) graphics data and non-secure graphics data. For example, an application may store protected graphics data in a secure memory location, and unprotected graphics data in a non-secure memory location. Accordingly, upon booting, the GPU may reserve: (i) a first range of virtual addresses corresponding to a secure memory region, and (ii) a second range of virtual addresses corresponding to a non-secure memory region.

However, in conventional systems, the first range of virtual addresses may correspond to a relatively small amount (e.g., 256 MB) of secure memory resources, while the second range of virtual addresses correspond to a relatively large amount (e.g., approximately 4 GB) of non-secure memory resources, such that together the secure and non-secure memory resources are addressable using 32-bits. Moreover, because the GPU reserves a fixed range of virtual addresses for secure and non-secure memory resources upon booting, it may be difficult to satisfy both secure and non-secure application needs dynamically during runtime. For example, if the GPU increases the virtual address range for secure memory resources during runtime, the same virtual address range for non-secure memory resources will no longer be available and applications may run out of non-secure memory resources. Thus, methods for improving availability of secure and/or non-secure memory resources would be beneficial.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In certain aspects, a method for accessing secure memory ranges is disclosed. In one example, the method includes reserving a first memory address range within a 32-bit address range for non-secure memory. In another example, the method includes, reserving a second memory address range within a 64-bit address range and outside the 32-bit address range for secure memory. In another example, the method includes receiving, by a 64-bit kernel, a first command from a 32-bit application for accessing the secure memory. In another example, the method includes preparing, by the 64-bit kernel, a 64-bit memory access command based on the first command. In another example, the method includes transmitting, by the 64-bit kernel, the 64-bit memory access command to a graphics processing unit (GPU). In another example, the method includes accessing, by the GPU, the secure memory based on the 64-bit memory access command.

In certain aspects, a computing device configured for accessing secure memory ranges is disclosed. In some examples, the computing device comprises a memory and a processor communicatively coupled to the memory. In some examples, the processor is configured to reserve a first memory address range within a 32-bit address range for non-secure memory. In some examples, the processor is configured to reserve a second memory address range within a 64-bit address range and outside the 32-bit address range for secure memory. In some examples, the processor is configured to receive, by a 64-bit kernel, a first command from a 32-bit application for accessing the secure memory. In some examples, the processor is configured to prepare, by the 64-bit kernel, a 64-bit memory access command based on the first command. In some examples, the processor is configured to transmit, by the 64-bit kernel, the 64-bit memory access command to a graphics processing unit (GPU). In some examples, the processor is configured to access, by the GPU, the secure memory based on the 64-bit memory access command.

In certain aspects, a computing device for accessing secure memory ranges is disclosed. In one example, the computing device includes means for reserving a first memory address range within a 32-bit address range for non-secure memory. In one example, the computing device includes means for reserving a second memory address range within a 64-bit address range and outside the 32-bit address range for secure memory. In one example, the computing device includes means for receiving a first command from a 32-bit application for accessing the secure memory. In one example, the computing device includes means for preparing a 64-bit memory access command based on the first command. In one example, the computing device includes means for transmitting the 64-bit memory access command to a graphics processing unit (GPU). In one example, the computing device includes means for accessing the secure memory based on the 64-bit memory access command.

In certain aspects, a non-transitory computer-readable medium having instructions stored thereon that, when executed by a computing device, cause the computing device to perform operations for accessing secure memory ranges, is disclosed. In one example, the operations include reserving a first memory address range within a 32-bit address range for non-secure memory. In one example, the operations include reserving a second memory address range within a 64-bit address range and outside the 32-bit address range for secure memory. In one example, the operations include receiving, by a 64-bit kernel, a first command from a 32-bit application for accessing the secure memory. In one example, the operations include preparing, by the 64-bit kernel, a 64-bit memory access command based on the first command. In one example, the operations include transmitting, by the 64-bit kernel, the 64-bit memory access command to a graphics processing unit (GPU). In one example, the operations include accessing, by the GPU, the secure memory based on the 64-bit memory access command.

The details of one or more examples of the disclosure are set forth in the accompanying drawings and the description below. Other features, objects, and advantages of the disclosure will be apparent from the description and drawings, and from the claims.

DETAILED DESCRIPTION

The present disclosure provides techniques for increasing a virtual address range corresponding to secure memory for storing data (e.g., protected graphics).

In certain aspects, a graphics processing unit (GPU) may include integrated circuit hardware for graphics processing. The GPU may include a software aspect, referred to herein as a "GPU driver" that may operate as part of a central processing unit (CPU). Upon booting up, the GPU driver may reserve exclusive ranges of possible 32-bit virtual addresses, wherein a first range corresponds to secure memory resources, and a second range corresponds to non-secure memory resources. In one example, for a 32-bit application, the GPU driver may reserve a 4 gigabyte (GB) range of non-secure virtual addresses, as well as a 256 megabyte (MB) range of secure virtual addresses exclusive from the non-secure virtual addresses. However, by reserving such a disparate range between non-secure and secure virtual addresses, it may be difficult to satisfy both secure and non-secure application needs dynamically during runtime. For example, any increase in the secure virtual address range during runtime would necessarily result in a complementary reduction of the non-secure virtual address range. Such an impact on the non-secure virtual address range could result in loss of available virtual addresses for non-secure applications. Thus, techniques for increasing the range of secure virtual addresses without compromising the amount of available non-secure virtual addresses may improve GPU functionality.

In order to increase the range of secure virtual addresses without compromising available non-secure virtual addresses, the GPU driver may be configured to reserve a first range of 64-bit virtual addresses corresponding to secure memory resources, and a second range of 32-bit virtual memory addresses corresponding to non-secure memory resources. The range of 64-bit virtual addresses may be those higher and exclusive from the 32-bit range. For example, non-secure memory resources may be addressed by a virtual address range from 0 to $2^{32}-1$, and secure memory resources may be addressed by a virtual address range from $2^{32}$ to X, where X is some value between $2^{32}+1$ and $2^{64}-1$. In other words, the GPU driver may increase the range of virtual addresses corresponding to secure memory resources by using 64-bit virtual addresses instead of 32-bit virtual addresses.

Various aspects of systems, apparatuses, computer program products, and methods are described more fully hereinafter for increasing a virtual address range corresponding to secure memory resources for storing data. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different graphics technologies, system configurations, etc., some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs, central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software.

Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit (DPU). Graphical content may be processed to become display content. For example, a graphics processing unit may output graphical content, such as a frame, to a buffer (which may be referred to as a framebuffer). A DPU may read the graphical content, such as one or more frames from the buffer, and perform one or more display processing techniques thereon to generate display content. For example, a DPU may be configured to perform composition on one or more rendered layers to generate a frame. As another example, a DPU may be configured to compose, blend, or otherwise combine two or more layers together into a single frame. A DPU may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Figure 1:
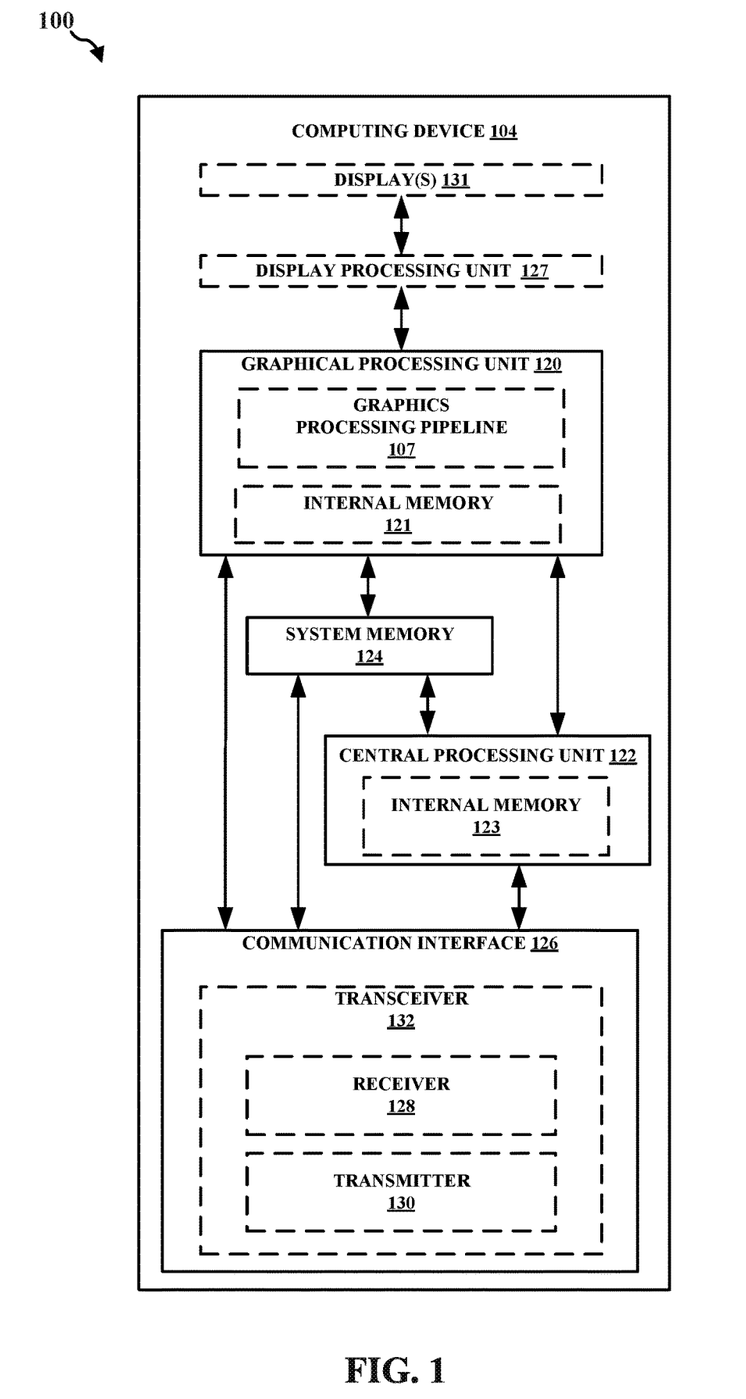
FIG. 1 is a block diagram that illustrates an example content generation system, in accordance with certain aspects of the present disclosure.

FIG. 1 is a block diagram that illustrates an example content generation system 100 configured to implement one or more techniques of this disclosure. The content generation system 100 includes a computing device 104. The computing device 104 may include one or more components or circuits for performing various functions described herein. In some examples, one or more components of the computing device 104 may be components of a system on a chip (SOC) or integrated circuit (IC). The computing device 104 may include one or more components configured to perform one or more techniques of this disclosure. In the example shown, the device 104 may include a GPU 120, a CPU 122, and a system memory 124. In some aspects, the device 104 can include a number of optional components, e.g., a communication interface 126, a transceiver 132, a receiver 128, a transmitter 130, a DPU 127, and one or more displays 131.

Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The GPU 120 may include an internal memory 121. The GPU 120 may be configured to perform graphics processing, such as in a graphics processing pipeline 107. The CPU 122 may include an internal memory 123. In some examples, the device 104 may include a display processor, such as the DPU 127, to perform one or more display processing techniques on one or more frames generated by the GPU 120 before presentment by the one or more displays 131. The DPU 127 may be configured to perform display processing. For example, the DPU 127 may be configured to perform one or more display processing techniques on one or more frames generated by the GPU 120. The one or more displays 131 may be configured to display or otherwise present frames processed by the DPU 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the GPU 120 and the CPU 122, such as system memory 124, may be accessible to the GPU 120 and the CPU 122. For example, the GPU 120 and the CPU 122 may be configured to read from and/or write to external memory, such as the system memory 124. The GPU 120 and the CPU 122 may be communicatively coupled to the system memory 124 over a bus. In some examples, the GPU 120 and the CPU 122 may be communicatively coupled to each other over the bus or a different connection.

The CPU 122 may be configured to receive graphical content from any source, such as the system memory 124 and/or the communication interface 126. The system memory 124 may be configured to store received encoded or decoded graphical content. The CPU 122 may be configured to receive encoded or decoded graphical content, e.g., from the system memory 124 and/or the communication interface 126, in the form of encoded pixel data. The CPU 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The GPU 120 may be a general purpose GPU, or any other processing unit that may be configured to perform graphics processing. In some examples, the GPU 120 may be integrated into a motherboard of the device 104. In some examples, the GPU 120 may be present on a graphics card that is installed in a port in a motherboard of the device 104, or may be otherwise incorporated within a peripheral device configured to interoperate with the device 104. The GPU 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the GPU 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The CPU 122 may be any processing unit configured to send instructions to the GPU 120 and perform general computational processing (e.g., non-graphical processing). In some examples, the CPU 122 may be integrated into a motherboard of the device 104. The CPU 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the CPU 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular hardware component (e.g., a GPU), but, in further embodiments, can be performed using other hardware components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
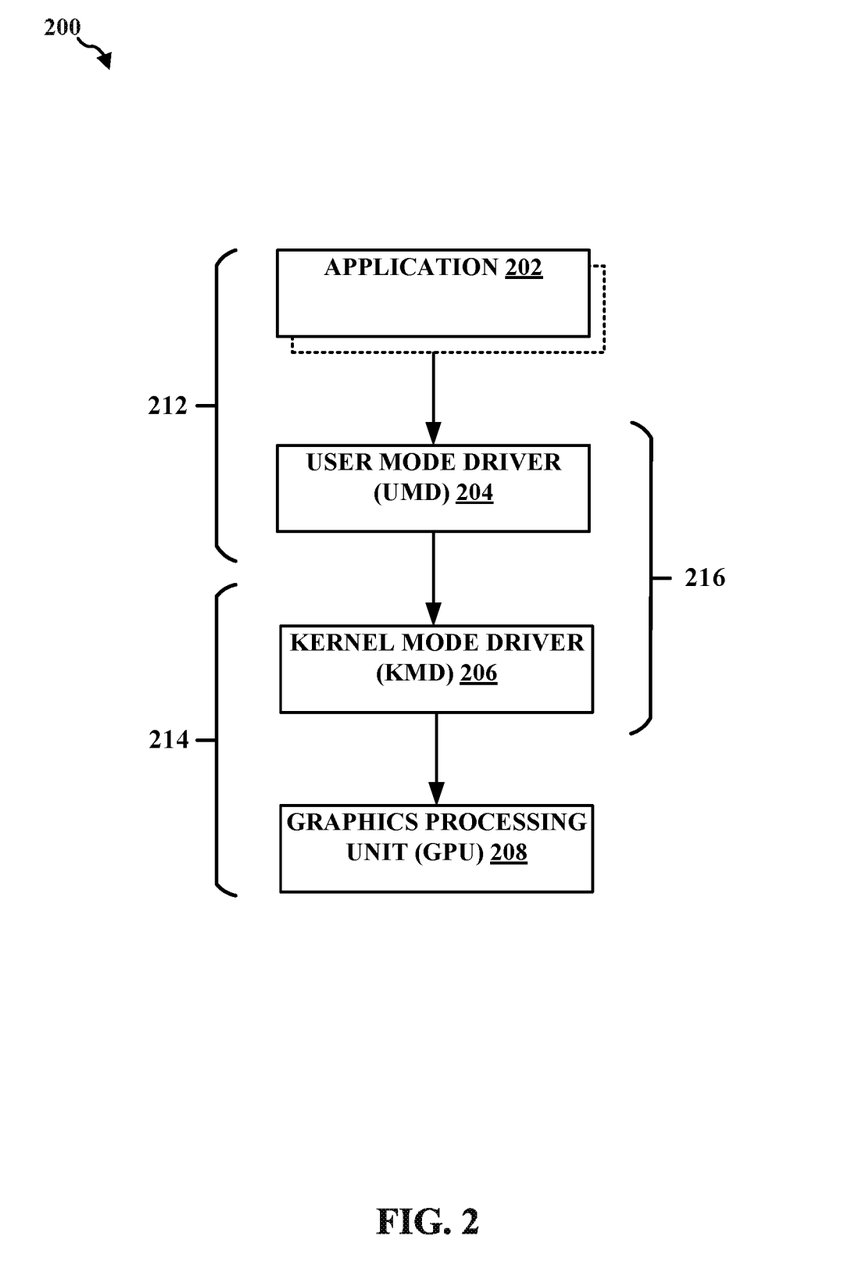
FIG. 2 is a block diagram illustrating an example graphics processing system, in accordance with certain aspects of the present disclosure.

FIG. 2 is a block diagram illustrating an example graphics processing system 200. The system 200 generally includes a user-mode domain 212 and a kernel-mode domain 214. One or more applications 202 (e.g., applications and/or processes executing in the CPU 122 of FIG. 1) may execute in the user-mode domain 212. In some examples, a graphics device driver 216 (e.g., a GPU driver of GPU 120 of FIG. 1) may be implemented in either or both the user-mode domain 212 and the kernel-mode domain 214. The graphics processing system may be part of a 64-bit kernel or runtime environment, such as of an operating system executing on CPU 122 of system 100.

On the user-mode side, the system 200 includes a user-mode driver (UMD) 204 configured to receive a graphics workload, including graphics commands such as memory writes, memory-mapped input/output (MMIO) writes, memory reads, or any other graphics commands, from one or more applications 202. The one or more applications 202 may include one or more 32-bit and/or 64-bit applications 202. The one or more applications 202 can be any application that generates memory commands (e.g., reads, writes, deletes, etc.). In response to a memory command, the UMD 204 may determine whether the command is to secure or non-secure memory. For example, if the memory command is to secure memory, the UMD 204 may determine a 64-bit virtual memory address from a range of 64-bit virtual memory addresses outside the possible 32-bit virtual memory address range (e.g., greater than $2^{32}-1$) corresponding to secure memory resources. In contrast, if the command is to non-secure memory, the UMD 204 may determine a 32-bit virtual memory address from a range of 32-bit virtual memory addresses corresponding to non-secure memory resources. The UMD 204 may then provide the command (e.g., a command buffer location) and the determined virtual memory address, along with an indication of whether the command is secure (e.g., a security token), to a kernel-mode driver (KMD) 206.

The kernel-mode domain 214 may include the KMD 206 and the GPU 208. The KMD 206 may be configured to receive the memory command, the virtual memory address, and the indication of whether the command is secure. In some examples, the KMD 206 may validate any received command designated as secure. The KMD 206 may then provide the command, virtual memory address, and indication of whether the command is secure to the GPU 208. For example, the KMD 206 may output the command to a batch buffer that designates security status (secure or non-secure) of the corresponding batch buffer. The GPU 208 may receive the batch buffer command from the KMD 206, and execute the command (e.g., read/write) using a physical memory resource corresponding to the virtual memory address, for example by using a page table that maps virtual memory addresses to physical memory addresses.

Figure 3:
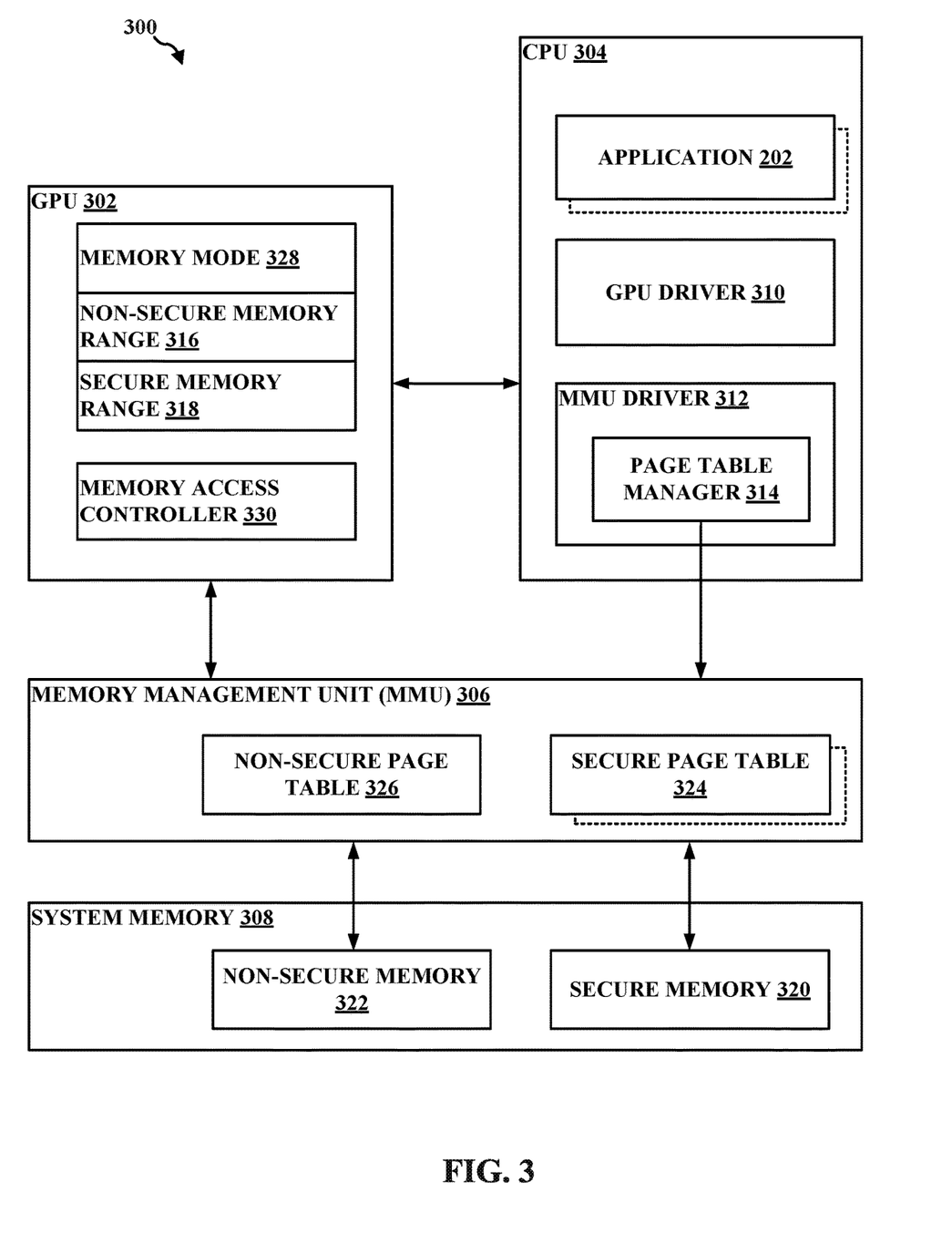
FIG. 3 is a block diagram illustrating example hardware and software aspects configured in accordance with certain aspects of the present disclosure.

FIG. 3 is a block diagram illustrating example hardware and software aspects 300 configured to use the techniques of this disclosure. The example hardware and software aspects 300 may be included as aspects of the computing device 104 of FIG. 1. In the example shown, the example hardware and software aspects 300 may include a GPU 302 (e.g., GPU 120 of FIG. 1), a CPU 304 (e.g., CPU 122 of FIG. 1), a memory management unit 306, and a system memory 308 (e.g., system memory 124 of FIG. 1).

The CPU 304 may include a plurality of device drivers, which are shown in the example of FIG. 3 as "GPU driver 310" and "MMU driver 312." Each of the GPU driver 310 and the MMU driver 312 may include one or more components in the user-mode domain 212 and the kernel-mode domain 214 shown in FIG. 2. That is, aspects of the GPU driver 310 and the MMU driver 312 may operate as one or more of a UMD 204 and/or a KMD 206. The device drivers may be stored as a software program and executed by the CPU 304 in order to provide a communication interface between one or more hardware devices and an operating system. For example, an application 202 or other process executing on the CPU 304 may issue graphics commands to the GPU 302 via the GPU driver 310, or memory commands to a memory management unit (MMU) 306 via an MMU driver 312.

Upon booting, the GPU driver 310 may reserve: (i) a range of non-secure virtual memory addresses 316 corresponding to non-secure memory resources 322, and (ii) a range of secure virtual memory addresses 318 corresponding to secure memory resources 320. The non-secure memory resources 322 and the secure memory resources 320 may be resources of the system memory 308. The first range of virtual memory addresses may include 32-bit virtual addresses, while the second range of memory addresses may include 64-bit virtual addresses. It should be noted that the second range of virtual memory addresses are outside the addresses of the first range (e.g., no virtual address belongs to both the first range and the second range). The non-secure memory resources 322 and the secure memory resources 320 may be configured to store date (e.g., graphics information) associated with memory commands. The GPU driver 310 may store the range of non-secure virtual memory addresses 316 and the range of secure virtual memory addresses 318 in an internal memory (e.g., internal memory 121/123 of FIG. 1) accessible by the GPU 302.

As is understood in the art, a "virtual memory address" may address a virtual memory resource that an operating system (e.g., using a page table as discussed herein) maps to a physical memory resource, such that the applications do not refer to memory locations directly by their physical addresses of where they are actually located on physical memory. Accordingly, it should be noted that a virtual memory address is different from a physical memory address. As describe in more detail below, the MMU 306 may perform translation of virtual memory addresses into physical memory addresses.

The GPU driver 310 may notify the MMU driver 312 of the stored range of non-secure virtual memory addresses 316 and range of secure virtual memory addresses 318. Utilizing a page table manager 314, the MMU driver 312 may perform a mapping of the virtual memory addresses to physical memory addresses. For example the page table manager 314 may generate a non-secure page table 326 that provides a mapping between the 32-bit virtual addresses of the first range of virtual memory addresses to corresponding physical memory addresses. Likewise, the page table manager 314 may generate a secure page table 324 that provides a mapping between the 64-bit virtual addresses of the second range of virtual memory addresses to corresponding physical memory addresses.

The page table manager 314 may store the page tables in an internal memory accessible by the MMU 306 or in a location of the system memory 308. In some examples, the physical memory address may include a memory address that is represented in the form of a binary number associated with a location of the system memory 308. For example, the MMU 306 may receive a memory command that corresponds to a particular virtual memory address. Using the appropriate page table, the MMU 306 may determine the physical address and perform the memory command (e.g., read/write/delete/etc. data stored at that location).

Example Process for Increasing Secure Memory Virtual Address Range

Initially, the application 202 may submit a secure memory command to a user-mode driver (e.g., UMD 204 of FIG. 2). The secure memory command may be a request from the application 202 to utilize a location in secure memory 320. Because the memory command is secure, the UMD 204 may associate a virtual memory address from the secure memory range 318 with the memory command. In this example, the application is a 32-bit application and the virtual memory address is 64-bit address. The UMD 204 may pass the memory command, the virtual memory location, and an indication of the secure nature of the memory command to a kernel-mode driver (e.g., KMD 206 of FIG. 2), which may then provide the information to the GPU 302. That is, the UMD 204 and KMD 206 may prepare a 64-bit memory access command by associating the secure memory command with the 64-bit virtual memory address.

With receipt of the memory command, the KMD 206 and/or the GPU driver 310 may set a memory mode 328 of the GPU 302. The GPU's 302 memory mode 328 may include two modes: secure and non-secure. For example, if GPU 302 is placed in a non-secure mode, through the function of a memory access controller 330, the GPU 302 would prevent any I/O (input/output such as read, write, delete, etc.) access to secure memory 320 because the memory access controller 330 may only be able to perform I/O for non-secure memory 322 in the non-secure mode.

Because the GPU 302 may not have access to either of the non-secure or secure page tables, the GPU 302 may rely on the MMU 306 for translating the virtual address to a corresponding physical address. In the current example, the MMU 306 may also require an indication that the GPU 302 is in a secure memory mode before the MMU 306 can look up a physical memory address from a secure page table 324. Thus, the memory access controller 330 may generate a stream ID when the GPU 302 is in a secure memory mode. In some examples, the stream ID is a hardware signal that indicates to the MMU 306 that the GPU 302 is in the secure memory mode. For example, the stream ID may be a 1-bit state indication of whether the GPU 302 is in secure or non-secure memory mode.

In the current example, because the 64-bit virtual memory address received by the GPU 302 is within the secure memory address range 318, the memory access controller 330 may set the stream ID to indicate that the GPU 302 is in secure memory mode 328. The GPU 302 may then send the secure virtual memory address to the MMU 306. Once the MMU 306 determines that the GPU 302 is in secure memory mode, the MMU may determine a secure physical memory address corresponding to the secure virtual memory address using the secure page table 324. The MMU 306 may then access the secure memory 320 location associated with the determined physical memory address. The MMU 306 and/or GPU 302 may then perform the command using the secure memory 320 location.

Example Process for Increasing Secure Memory Virtual Address Range in Multiple Applications In certain aspects, there may be multiple applications running on the CPU 304 and issuing secure graphics commands at the same time. In certain aspects, the page table manager 314 utilizes the same secure page table for each of the multiple applications, which means that the multiple applications share the same virtual address range. This may limit the amount of memory addressable by the multiple applications. In certain aspects, the page table manager 314 may generate a separate secure page table for each of the multiple applications. In one example, the UMD 204 or GPU driver 310 may prompt the MMU driver 312 to generate separate secure page tables for multiple applications after receiving multiple secure memory commands from more than one application. In the case of two 32-bit applications issuing secure memory commands, the page table manager 314 may then generate a first secure page table for a first 32-bit application, and a second page table for a second 32-bit application. Here, the first page table may map a range of 64-bit virtual memory addresses to physical addresses in the secure memory 320. Likewise, the second secure page table may map the same range of 64-bit virtual memory addresses to physical addresses in the secure memory 320. In certain aspects, the use of separate secure page tables for each application (or groups of applications) may similarly be used even where the secure virtual address range is within the 32-bit addressing range, such that the 32-bit addressing range is divided between secure and non-secure memory.

However, the MMU 306 may not be aware of which application is associated with which page table, or even which command corresponds to which application. Accordingly, the MMU 306 may need to be notified of which page table (e.g., the first secure page table or the second secure page table) to use prior to receiving a secure command with a virtual memory address from the GPU 302. In order to prepare the MMU 306 to use the correct secure page table for an incoming secure command, the GPU driver 310 may use one of two different methods.

In a first method, the GPU driver 310 may receive a first secure memory command from the first application. Because there are multiple applications issuing secure memory commands, the GPU driver 310 may communicate a request to the MMU driver 312 requesting that the MMU driver 312 change an address value of a base address at the MMU 306. Here the request may indicate to the MMU driver 312 to change the address value of the base address to a value corresponding to a location of the first secure page table associated with the first application. In some examples, the base address is a register value used by the MMU 306 to determine a storage location of a secure page table.

The MMU driver 312 may then change the address value of the base address to reflect the location of the first secure page table. In some examples, the GPU driver 310 may provide the MMU driver 312 with the location of the first secure page table. However, if the GPU driver 310 cannot access such information, the MMU driver 312 may determine the location of the first secure page table based on data provided by the GPU driver (e.g., an identifier of the first application, or any other suitable information).

The MMU driver 312 may then notify the GPU driver 310 that the address value of the base address has been set to reflect the location of the first secure page table. In response to the notification, the GPU driver 310 may then provide the first secure memory command to the GPU 302. As discussed above, the GPU 302 may then provide the first secure memory command to the MMU 306, which will then use the first secure page table (which is dedicated to the first application from which the first secure graphics command originated) to map the virtual memory address of the first secure memory command to a corresponding physical memory address.

In a second method, the GPU driver 310 may receive the first secure memory command from the first application. However, instead of notifying the MMU driver 312, the GPU driver 310 may communicate a request to the GPU 302, requesting that the GPU 302 change the address value of the base address at the MMU 306. Here the request may indicate to the GPU 302 to change the address value of the base address to a value corresponding to a location of the first secure page table associated with the first application. The GPU 302 may then change the address value of the base address to reflect the location of the first secure page table. In this method, the GPU driver 310 may communicate the request to the GPU 302 with the first secure memory command. As such, the GPU 302 may set the base address, then provide the virtual memory address associated with the first secure memory command to the MMU 306.

If the GPU driver 310 receives a second secure memory command from a second application, the GPU driver may perform either of the first method or the second method to ensure that the base address of the MMU 306 is changed from the first secure page table to the second secure page table before the second secure memory command is issued to the MMU 306. In some examples, the GPU driver 310 may first confirm that the first secure memory command has been completed before performing either of the first method or the second method to update base address.

Figure 4:
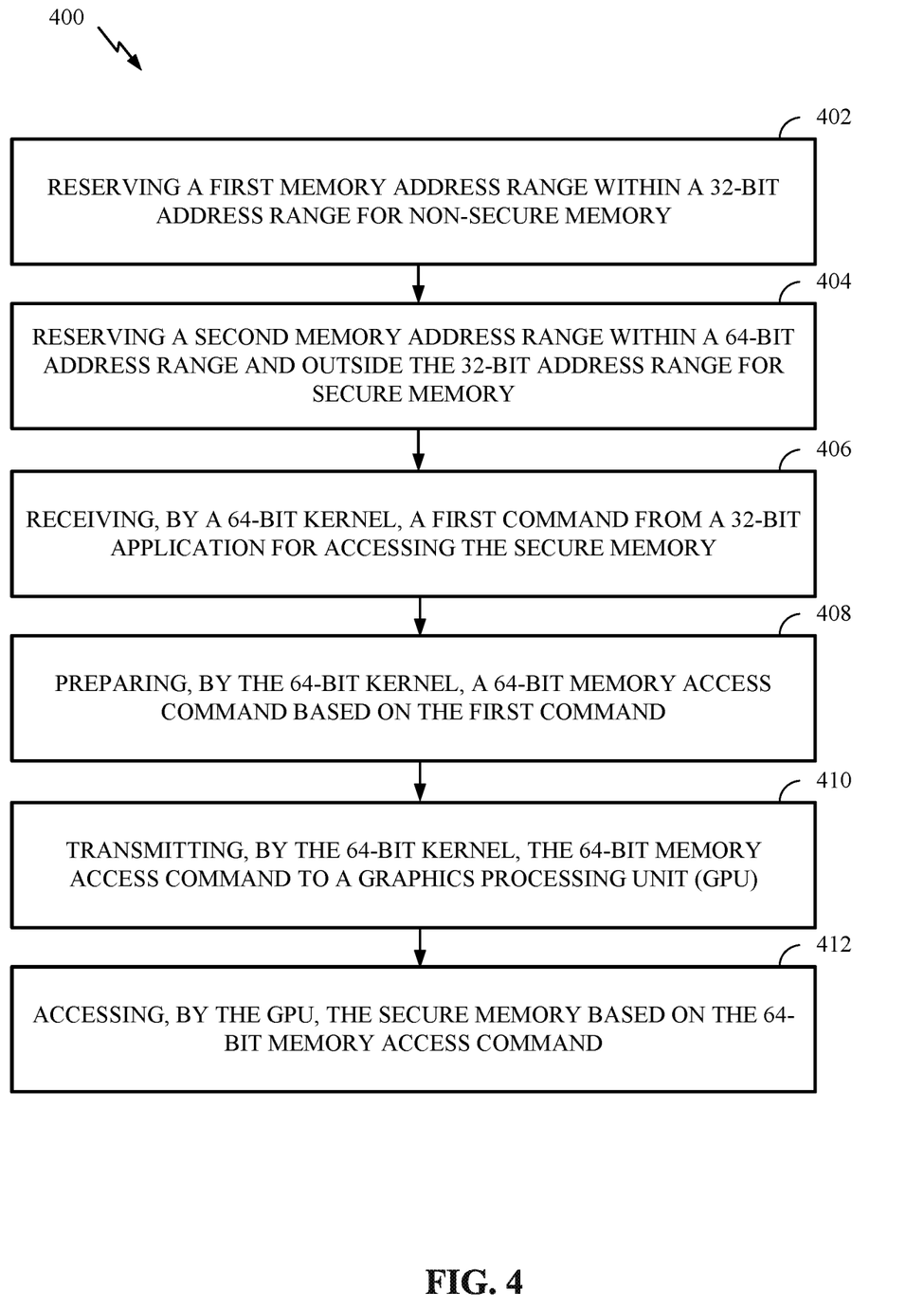
FIG. 4 is a flow diagram illustrating example operations for allocating memory resources for secure graphics commands, in accordance with certain aspects of the present disclosure.

FIG. 4 is a flow diagram illustrating example operations 400 for allocating memory resources for secure graphics commands, in accordance with certain aspects of the present disclosure. The operations 400 may be performed, for example, by a computing device (e.g., computing device 104 of FIG. 1). Operations 400 may be implemented as software components that are executed and run on one or more processors (e.g., CPU 122/304, GPU 120/302, and MMU 306 of FIGS. 1 and 3).

The operations 400 may begin, at a first block 402, by reserving a first memory address range within a 32-bit address range for non-secure memory.

The operations 400 may continue, at a second block 404, by reserving a second memory address range within a 64-bit address range and outside the 32-bit address range for secure memory.

The operations 400 may continue, at a third block 406, by receiving, by a 64-bit kernel, a first command from a 32-bit application for accessing the secure memory.

The operations 400 may continue, at a fourth block 408, by preparing, by the 64-bit kernel, a 64-bit memory access command based on the first command.

The operations 400 may continue, at a fifth block 410, by transmitting, by the 64-bit kernel, the 64-bit memory access command to a graphics processing unit (GPU).

The operations 400 may continue, at a sixth block 412, by accessing, by the GPU, the secure memory based on the 64-bit memory access command.

In certain aspects, the operations 400 include generating a first page table for the 32-bit application, wherein the first page table maps a first 64-bit virtual address within the 64-bit address range to a first physical address in the secure memory; and generating a second page table for a second 32-bit application, wherein the second page table maps the first 64-bit virtual address to a second physical address in the secure memory.

In certain aspects, the operations 400 include, in response to receiving the first command, setting, by a GPU driver, a base address value at a memory management unit (MMU) to a first address value corresponding to a location of the first page table, wherein transmitting the 64-bit memory access command to the GPU further comprises transmitting the 64-bit memory access command to the GPU after setting the base address value to the first address value.

In certain aspects, the operations 400 include determining, by the MMU, the first physical address corresponding to the first 64-bit virtual address based on the first page table, wherein accessing the secure memory based on the 64-bit memory access command further comprises accessing the secure memory using the first physical address.

In certain aspects, the operations 400 include receiving, by the 64-bit kernel, a second command from the second 32-bit application for accessing the secure memory; in response to receiving the second command, setting, by the GPU driver, the base address value at the MMU to a second address value corresponding to a location of the second page table; preparing, by the 64-bit kernel, a second 64-bit memory access command based on the second command; and transmitting, by the 64-bit kernel, the second 64-bit memory access command to the GPU after setting the base address value to the second address value.

In certain aspects, the operations 400 include, in response to receiving the second command, determining whether execution of the first command is completed, wherein setting the base address value at the MMU to the second address value further comprises setting the base address value at the MMU to the second address value after determining that execution of the first command is completed.

In certain aspects, the first memory address range comprises a first range of virtual addresses corresponding to non-secure memory resources; and the second memory address range comprises a second range of virtual addresses corresponding to secure memory resources.

In certain aspects, preparing the 64-bit memory access command further comprises associating, by the 64-bit kernel, a 64-bit virtual address to the first command, wherein the 64-bit memory access command comprises the 64-bit virtual address and the first command.

In certain aspects, the reserving the first memory address range and the reserving the second memory address range is performed by a GPU driver.

Example Aspects

Implementation examples are described in the following numbered clauses:

1. A method for accessing secure memory ranges comprising: reserving a first memory address range within a 32-bit address range for non-secure memory; reserving a second memory address range within a 64-bit address range and outside the 32-bit address range for secure memory; receiving, by a 64-bit kernel, a first command from a 32-bit application for accessing the secure memory; preparing, by the 64-bit kernel, a 64-bit memory access command based on the first command; transmitting, by the 64-bit kernel, the 64-bit memory access command to a graphics processing unit (GPU); and accessing, by the GPU, the secure memory based on the 64-bit memory access command.

2. The method of aspect 1, further comprising: generating a first page table for the 32-bit application, wherein the first page table maps a first 64-bit virtual address within the 64-bit address range to a first physical address in the secure memory; and generating a second page table for a second 32-bit application, wherein the second page table maps the first 64-bit virtual address to a second physical address in the secure memory.

3. The method of aspect 2, further comprising, in response to receiving the first command, setting, by a GPU driver, a base address value at a memory management unit (MMU) to a first address value corresponding to a location of the first page table, wherein transmitting the 64-bit memory access command to the GPU further comprises transmitting the 64-bit memory access command to the GPU after setting the base address value to the first address value.

4. The method of aspect 3, further comprising determining, by the MMU, the first physical address corresponding to the first 64-bit virtual address based on the first page table, wherein accessing the secure memory based on the 64-bit memory access command further comprises accessing the secure memory using the first physical address.

5. The method of aspect 3, further comprising: receiving, by the 64-bit kernel, a second command from the second 32-bit application for accessing the secure memory; in response to receiving the second command, setting, by the GPU driver, the base address value at the MMU to a second address value corresponding to a location of the second page table; preparing, by the 64-bit kernel, a second 64-bit memory access command based on the second command; and transmitting, by the 64-bit kernel, the second 64-bit memory access command to the GPU after setting the base address value to the second address value.

6. The method of aspect 5, further comprising, in response to receiving the second command, determining whether execution of the first command is completed, wherein setting the base address value at the MMU to the second address value further comprises setting the base address value at the MMU to the second address value after determining that execution of the first command is completed.

7. The method of any of aspects 1-6, wherein: the first memory address range comprises a first range of virtual addresses corresponding to non-secure memory resources; and the second memory address range comprises a second range of virtual addresses corresponding to secure memory resources.

8. The method of any of aspects 1-7, wherein preparing the 64-bit memory access command further comprises associating, by the 64-bit kernel, a 64-bit virtual address to the first command, wherein the 64-bit memory access command comprises the 64-bit virtual address and the first command.

9. The method of any of aspects 1-8, wherein the reserving the first memory address range and the reserving the second memory address range is performed by a GPU driver of the 64-bit kernel.

10. A computing device configured for accessing secure memory ranges, the computing device comprising: a memory; and one or more processors coupled to the memory, the one or more processors configured to: reserve a first memory address range within a 32-bit address range for non-secure memory; reserve a second memory address range within a 64-bit address range and outside the 32-bit address range for secure memory; receive a first command from a 32-bit application for accessing the secure memory; prepare a 64-bit memory access command based on the first command; transmit the 64-bit memory access command to a graphics processing unit (GPU); and access the secure memory based on the 64-bit memory access command.

11. The computing device of aspect 10, wherein the one or more processors are further configured to: generate a first page table for the 32-bit application, wherein the first page table maps a first 64-bit virtual address within the 64-bit address range to a first physical address in the secure memory; and generate a second page table for a second 32-bit application, wherein the second page table maps the first 64-bit virtual address to a second physical address in the secure memory.

12. The computing device of aspect 11, wherein the one or more processors are further configured to, in response to receiving the first command, set a base address value at a memory management unit (MMU) to a first address value corresponding to a location of the first page table, wherein the one or more processors, being configured to transmit the 64-bit memory access command to the GPU, are further configured to transmit the 64-bit memory access command to the GPU after setting the base address value to the first address value.

13. The computing device of aspect 12, wherein the one or more processors are further configured to determine the first physical address corresponding to the first 64-bit virtual address based on the first page table, wherein the one or more processors, being configured to access the secure memory based on the 64-bit memory access command, are further configured to access the secure memory using the first physical address.

14. The computing device of aspect 12, wherein the one or more processors are further configured to: receive a second command from the second 32-bit application for accessing the secure memory; set the base address value at the MMU to a second address value corresponding to a location of the second page table in response to the second command; prepare a second 64-bit memory access command based on the second command; and transmit the second 64-bit memory access command to the GPU after setting the base address value to the second address value.

15. The computing device of aspect 14, wherein the one or more processors are further configured to, in response to receiving the second command, determine whether execution of the first command is completed, wherein the one or more processors, being configured to set the base address value at the MMU to the second address value, are further configured to set the base address value at the MMU to the second address value after determining that execution of the first command is completed.

16. The computing device of any of aspects 10-15, wherein: the first memory address range comprises a first range of virtual addresses corresponding to non-secure memory resources; and the second memory address range comprises a second range of virtual addresses corresponding to secure memory resources.

17. The computing device of any of aspects 10-16, wherein preparing the 64-bit memory access command further comprises associating a 64-bit virtual address to the first command, wherein the 64-bit memory access command comprises the 64-bit virtual address and the first command.

18. The computing device of any of aspects 10-17, wherein the reserving the first memory address range and the reserving the second memory address range is performed by a GPU driver of the 64-bit kernel.

19. A computing device configured to access secure memory ranges, the computing device comprising: means for reserving a first memory address range within a 32-bit address range for non-secure memory; means for reserving a second memory address range within a 64-bit address range and outside the 32-bit address range for secure memory; means for receiving a first command from a 32-bit application for accessing the secure memory; means for preparing a 64-bit memory access command based on the first command; means for transmitting the 64-bit memory access command to a graphics processing unit (GPU); and means for accessing the secure memory based on the 64-bit memory access command.

20. The computing device of aspect 19, further comprising: means for generating a first page table for the 32-bit application, wherein the first page table maps a first 64-bit virtual address within the 64-bit address range to a first physical address in the secure memory; and means for generating a second page table for a second 32-bit application, wherein the second page table maps the first 64-bit virtual address to a second physical address in the secure memory.

21. The computing device of aspect 20, further comprising means for setting, in response to receiving the first command, a base address value at a memory management unit (MMU) to a first address value corresponding to a location of the first page table, wherein the means for transmitting the 64-bit memory access command to the GPU further comprises means for transmitting the 64-bit memory access command to the GPU after setting the base address value to the first address value.

22. The computing device of aspect 21, further comprising means for determining the first physical address corresponding to the first 64-bit virtual address based on the first page table, wherein the means for accessing the secure memory based on the 64-bit memory access command further comprises means for accessing the secure memory using the first physical address.

23. The computing device of aspect 21, further comprising: means for receiving a second command from the second 32-bit application for accessing the secure memory; means for setting, in response to receiving the second command, the base address value at the MMU to a second address value corresponding to a location of the second page table; means for preparing a second 64-bit memory access command based on the second command; and means for transmitting the second 64-bit memory access command to the GPU after setting the base address value to the second address value.

24. The computing device of aspect 23, further comprising means for determining, in response to receiving the second command, whether execution of the first command is completed, wherein the means for setting the base address value at the MMU to the second address value further comprises means for setting the base address value at the MMU to the second address value after determining that execution of the first command is completed.

25. The computing device of any of aspects 19-24, wherein: the first memory address range comprises a first range of virtual addresses corresponding to non-secure memory resources; and the second memory address range comprises a second range of virtual addresses corresponding to secure memory resources.

26. The computing device of any of aspects 19-25, wherein the means for preparing the 64-bit memory access command further comprises means for associating a 64-bit virtual address to the first command, wherein the 64-bit memory access command comprises the 64-bit virtual address and the first command.

27. The computing device of any of aspect 19-26, wherein the means for reserving the first memory address range and the means for reserving the second memory address range comprise a GPU driver of a 64-bit kernel.

28. The computing device of any of aspects 19-27, wherein: means for reserving comprises a 64-bit kernel; means for receiving comprises the 64-bit kernel; means for preparing comprises the 64-bit kernel; means for transmitting comprises the 64-bit kernel; and means for accessing comprises a graphics processing unit (GPU).

29. A non-transitory computer-readable medium having instructions stored thereon that, when executed by a computing device, cause the computing device to perform operations for accessing secure memory ranges comprising: reserving a first memory address range within a 32-bit address range for non-secure memory; reserving a second memory address range within a 64-bit address range and outside the 32-bit address range for secure memory; receiving, by a 64-bit kernel, a first command from a 32-bit application for accessing the secure memory; preparing, by the 64-bit kernel, a 64-bit memory access command based on the first command; transmitting, by the 64-bit kernel, the 64-bit memory access command to a graphics processing unit (GPU); and accessing, by the GPU, the secure memory based on the 64-bit memory access command.

30. The non-transitory computer-readable medium of aspect 29, wherein the operations further comprise: generating a first page table for the 32-bit application, wherein the first page table maps a first 64-bit virtual address within the 64-bit address range to a first physical address in the secure memory; and generating a second page table for a second 32-bit application, wherein the second page table maps the first 64-bit virtual address to a second physical address in the secure memory.

Additional Considerations

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method for accessing secure memory ranges comprising:
   reserving a first memory address range within a 32-bit address range for non-secure memory;
   reserving a second memory address range within a 64-bit address range and outside the 32-bit address range for secure memory;
   receiving, by a 64-bit kernel, a first command from a 32-bit application for accessing the secure memory;
   preparing, by the 64-bit kernel, a 64-bit memory access command based on the first command;
   transmitting, by the 64-bit kernel, the 64-bit memory access command to a graphics processing unit (GPU); and
   accessing, by the GPU, the secure memory based on the 64-bit memory access command.

2. The method of claim 1, further comprising:
   generating a first page table for the 32-bit application, wherein the first page table maps a first 64-bit virtual address within the 64-bit address range to a first physical address in the secure memory; and
   generating a second page table for a second 32-bit application, wherein the second page table maps the first 64-bit virtual address to a second physical address in the secure memory.

3. The method of claim 2, further comprising, in response to receiving the first command, setting, by a GPU driver, a base address value at a memory management unit (MMU) to a first address value corresponding to a location of the first page table, wherein transmitting the 64-bit memory access command to the GPU further comprises transmitting the 64-bit memory access command to the GPU after setting the base address value to the first address value.

4. The method of claim 3, further comprising determining, by the MMU, the first physical address corresponding to the first 64-bit virtual address based on the first page table, wherein accessing the secure memory based on the 64-bit memory access command further comprises accessing the secure memory using the first physical address.

5. The method of claim 3, further comprising:
   receiving, by the 64-bit kernel, a second command from the second 32-bit application for accessing the secure memory;
   in response to receiving the second command, setting, by the GPU driver, the base address value at the MMU to a second address value corresponding to a location of the second page table;
   preparing, by the 64-bit kernel, a second 64-bit memory access command based on the second command; and
   transmitting, by the 64-bit kernel, the second 64-bit memory access command to the GPU after setting the base address value to the second address value.

6. The method of claim 5, further comprising, in response to receiving the second command, determining whether execution of the first command is completed, wherein setting the base address value at the MMU to the second address value further comprises setting the base address value at the MMU to the second address value after determining that execution of the first command is completed.

7. The method of claim 1, wherein:
   the first memory address range comprises a first range of virtual addresses corresponding to non-secure memory resources; and
   the second memory address range comprises a second range of virtual addresses corresponding to secure memory resources.

8. The method of claim 1, wherein preparing the 64-bit memory access command further comprises associating, by the 64-bit kernel, a 64-bit virtual address to the first command, wherein the 64-bit memory access command comprises the 64-bit virtual address and the first command.

9. The method of claim 1, wherein the reserving the first memory address range and the reserving the second memory address range is performed by a GPU driver of the 64-bit kernel.

10. A computing device configured for accessing secure memory ranges, the computing device comprising:
a memory; and
one or more processors coupled to the memory, the one or more processors configured to:
reserve a first memory address range within a 32-bit address range for non-secure memory;
reserve a second memory address range within a 64-bit address range and outside the 32-bit address range for secure memory;
receive a first command from a 32-bit application for accessing the secure memory;
prepare a 64-bit memory access command based on the first command;
transmit the 64-bit memory access command to a graphics processing unit (GPU); and
access the secure memory based on the 64-bit memory access command.

11. The computing device of claim 10, wherein the one or more processors are further configured to:
generate a first page table for the 32-bit application, wherein the first page table maps a first 64-bit virtual address within the 64-bit address range to a first physical address in the secure memory; and
generate a second page table for a second 32-bit application, wherein the second page table maps the first 64-bit virtual address to a second physical address in the secure memory.

12. The computing device of claim 11, wherein the one or more processors are further configured to, in response to receiving the first command, set a base address value at a memory management unit (MMU) to a first address value corresponding to a location of the first page table, wherein the one or more processors, being configured to transmit the 64-bit memory access command to the GPU, are further configured to transmit the 64-bit memory access command to the GPU after setting the base address value to the first address value.

13. The computing device of claim 12, wherein the one or more processors are further configured to determine the first physical address corresponding to the first 64-bit virtual address based on the first page table, wherein the one or more processors, being configured to access the secure memory based on the 64-bit memory access command, are further configured to access the secure memory using the first physical address.

14. The computing device of claim 12, wherein the one or more processors are further configured to:
receive a second command from the second 32-bit application for accessing the secure memory;
set the base address value at the MMU to a second address value corresponding to a location of the second page table in response to the second command;
prepare a second 64-bit memory access command based on the second command; and
transmit the second 64-bit memory access command to the GPU after setting the base address value to the second address value.

15. The computing device of claim 14, wherein the one or more processors are further configured to, in response to receiving the second command, determine whether execution of the first command is completed, wherein the one or more processors, being configured to set the base address value at the MMU to the second address value, are further configured to set the base address value at the MMU to the second address value after determining that execution of the first command is completed.

16. The computing device of claim 10, wherein:
the first memory address range comprises a first range of virtual addresses corresponding to non-secure memory resources; and
the second memory address range comprises a second range of virtual addresses corresponding to secure memory resources.

17. The computing device of claim 10, wherein preparing the 64-bit memory access command further comprises associating a 64-bit virtual address to the first command, wherein the 64-bit memory access command comprises the 64-bit virtual address and the first command.

18. The computing device of claim 10, wherein to reserve the first memory address range and to reserve the second memory address range is performed by a GPU driver of 8 64-bit kernel.

19. A computing device configured to access secure memory ranges, the computing device comprising:
means for reserving a first memory address range within a 32-bit address range for non-secure memory;
means for reserving a second memory address range within a 64-bit address range and outside the 32-bit address range for secure memory;
means for receiving a first command from a 32-bit application for accessing the secure memory;
means for preparing a 64-bit memory access command based on the first command;
means for transmitting the 64-bit memory access command to a graphics processing unit (GPU); and
means for accessing the secure memory based on the 64-bit memory access command.

20. The computing device of claim 19, further comprising:
means for generating a first page table for the 32-bit application, wherein the first page table maps a first 64-bit virtual address within the 64-bit address range to a first physical address in the secure memory; and
means for generating a second page table for a second 32-bit application, wherein the second page table maps the first 64-bit virtual address to a second physical address in the secure memory.

21. The computing device of claim 20, further comprising means for setting, in response to receiving the first command, a base address value at a memory management unit (MMU) to a first address value corresponding to a location of the first page table, wherein the means for transmitting the 64-bit memory access command to the GPU further comprises means for transmitting the 64-bit memory access command to the GPU after setting the base address value to the first address value.

22. The computing device of claim 21, further comprising means for determining the first physical address corresponding to the first 64-bit virtual address based on the first page table, wherein the means for accessing the secure memory based on the 64-bit memory access command further comprises means for accessing the secure memory using the first physical address.

23. The computing device of claim 21, further comprising:
means for receiving a second command from the second 32-bit application for accessing the secure memory;
means for setting, in response to receiving the second command, the base address value at the MMU to a second address value corresponding to a location of the second page table;
means for preparing a second 64-bit memory access command based on the second command; and means for transmitting the second 64-bit memory access command to the GPU after setting the base address value to the second address value.

24. The computing device of claim 23, further comprising means for determining, in response to receiving the second command, whether execution of the first command is completed, wherein the means for setting the base address value at the MMU to the second address value further comprises means for setting the base address value at the MMU to the second address value after determining that execution of the first command is completed.

25. The computing device of claim 19, wherein:
the first memory address range comprises a first range of virtual addresses corresponding to non-secure memory resources; and
the second memory address range comprises a second range of virtual addresses corresponding to secure memory resources.

26. The computing device of claim 19, wherein the means for preparing the 64-bit memory access command further comprises means for associating a 64-bit virtual address to the first command, wherein the 64-bit memory access command comprises the 64-bit virtual address and the first command.

27. The computing device of claim 19, wherein the means for reserving the first memory address range and the means for reserving the second memory address range comprise a GPU driver of a 64-bit kernel.

28. The computing device of claim 19, wherein:
means for reserving comprises a 64-bit kernel;
means for receiving comprises the 64-bit kernel;
means for preparing comprises the 64-bit kernel;
means for transmitting comprises the 64-bit kernel; and
means for accessing comprises a graphics processing unit (GPU).

29. A non-transitory computer-readable medium having instructions stored thereon that, when executed by a computing device, cause the computing device to perform operations for accessing secure memory ranges comprising:
reserving a first memory address range within a 32-bit address range for non-secure memory;
reserving a second memory address range within a 64-bit address range and outside the 32-bit address range for secure memory;
receiving, by a 64-bit kernel, a first command from a 32-bit application for accessing the secure memory;
preparing, by the 64-bit kernel, a 64-bit memory access command based on the first command;
transmitting, by the 64-bit kernel, the 64-bit memory access command to a graphics processing unit (GPU); and
accessing, by the GPU, the secure memory based on the 64-bit memory access command.

30. The non-transitory computer-readable medium of claim 29, wherein the operations further comprise:
generating a first page table for the 32-bit application, wherein the first page table maps a first 64-bit virtual address within the 64-bit address range to a first physical address in the secure memory; and
generating a second page table for a second 32-bit application, wherein the second page table maps the first 64-bit virtual address to a second physical address in the secure memory.

* * * * *